(12) United States Patent
Martin et al.

(10) Patent No.: US 11,831,549 B2
(45) Date of Patent: Nov. 28, 2023

(54) DEVICE AND METHOD FOR LOAD BALANCING

(71) Applicant: HUAWEI TECHNOLOGIES CO., LTD., Shenzhen (CN)

(72) Inventors: Sebastien Martin, Boulogne Billancourt (FR); Jeremie Leguay, Boulogne Billancourt (FR); Youcef Magnouche, Boulogne Billancourt (FR); Jie Zhang, Beijing (CN); Yuechen Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/181,029

(22) Filed: Mar. 9, 2023

(65) Prior Publication Data

US 2023/0216795 A1 Jul. 6, 2023

Related U.S. Application Data

(63) Continuation of application No. PCT/CN2020/114620, filed on Sep. 10, 2020.

(51) Int. Cl.
*H04L 47/125* (2022.01)
*H04L 45/24* (2022.01)
*H04L 45/28* (2022.01)

(52) U.S. Cl.
CPC .......... *H04L 47/125* (2013.01); *H04L 45/245* (2013.01); *H04L 45/28* (2013.01)

(58) Field of Classification Search
CPC ...... H04L 45/28; H04L 45/245; H04L 47/125
See application file for complete search history.

(56) References Cited

U.S. PATENT DOCUMENTS

| 8,264,955 | B2* | 9/2012 | Chao | H04L 41/12 |
| | | | | 370/227 |
| 8,422,379 | B2* | 4/2013 | Xu | H04L 41/0654 |
| | | | | 370/252 |
| 8,456,984 | B2* | 6/2013 | Ranganathan | H04L 49/70 |
| | | | | 370/254 |

(Continued)

OTHER PUBLICATIONS

Mohand Yazid Saidi et al. "Using Shared Risk Link Groups to enhance backup path computation", Jan. 2009, 13 pages. (Year: 2009).*

(Continued)

*Primary Examiner* — George C Neurauter, Jr.
(74) *Attorney, Agent, or Firm* — Maier & Maier, PLLC

(57) ABSTRACT

A controller is configured to obtain traffic information of one or more tunnels in the network, where the traffic information of each tunnel is indicative of a protection type of the tunnel against failures, and provide configuration information to each network node that is a head-end node of a determined tunnel with a certain protection type according to the obtained traffic information of the determined tunnel, where the configuration information includes a bandwidth threshold and a load balancing configuration for the determined tunnel. A network node is configured to receive configuration information from the controller, and send the notification to the controller, if it is determined that the traffic of the tunnel is above the bandwidth threshold.

20 Claims, 12 Drawing Sheets

(56) References Cited

U.S. PATENT DOCUMENTS

| | | | | |
|---|---|---|---|---|
| 8,611,232 | B2* | 12/2013 | Xu | H04L 41/0654 |
| | | | | 370/252 |
| 9,258,238 | B2* | 2/2016 | Bahadur | H04L 47/781 |
| 9,313,121 | B2* | 4/2016 | Swinkels | H04L 45/02 |
| 9,344,359 | B1* | 5/2016 | Tiruveedhula | H04L 45/16 |
| 9,413,634 | B2* | 8/2016 | Nadeau | H04L 45/0377 |
| 9,590,844 | B1* | 3/2017 | Esale | H04L 45/50 |
| 9,590,845 | B1* | 3/2017 | Esale | H04L 45/28 |
| 9,590,894 | B2* | 3/2017 | Ramachandran | H04L 47/72 |
| 9,634,924 | B2* | 4/2017 | Filsfils | H04L 45/245 |
| 9,843,511 | B2* | 12/2017 | Zhou | H04L 45/70 |
| 9,923,798 | B1* | 3/2018 | Bahadur | H04L 45/00 |
| 10,110,423 | B2* | 10/2018 | Skalecki | H04L 41/0663 |
| 10,355,980 | B2* | 7/2019 | Tambakuwala | H04L 45/28 |
| 10,728,087 | B2* | 7/2020 | Agarwal | H04L 41/0668 |
| 11,038,792 | B2* | 6/2021 | Kondreddy | H04L 45/645 |
| 11,588,725 | B2* | 2/2023 | Kondreddy | H04L 45/50 |
| 2013/0336116 | A1 | 12/2013 | Vasseur et al. | |
| 2021/0352005 | A1* | 11/2021 | Chen | H04L 12/4633 |
| 2023/0216795 | A1* | 7/2023 | Martin | H04L 47/125 |
| | | | | 709/226 |

OTHER PUBLICATIONS

M. Taillon et al. "Request for Comments (RFC) 8796: RSVP-TE Summary Fast Reroute Extensions for Label Switched Path (LSP) Tunnels", Jul. 2020, 18 pages. (Year: 2020).*

Mohand Yazid Saidi et al. "PLR-based heuristic for backup path computation in MPLS networks", Feb. 2009, 13 pages. (Year: 2009).*

R. Gandhi et al. "Request for Comments (RFC) 8537: Updates to the Fast Reroute Procedures for Co-routed Associated Bidirectional Label Switched Paths (LSPs)", Feb. 2019, 16 pages. (Year: 2019).*

M. Taillon et al. "Request for Comments (RFC) 8271: Updates to the Resource Reservation Protocol for Fast Reroute of Traffic Engineering GMPLS Label Switched Paths (LSPs)", Oct. 2017, 24 pages. (Year: 2017).*

Abdulbaset Taher Hassan. "Evaluation of Fast ReRoute Mechanisms in Broadband Networks", University of Ottawa, Ottawa, Ontario, Canada, Oct. 2010, 108 pages. (Year: 2010).*

Cisco Systems, Inc. "MPLS Traffic Engineering-Fast Reroute Link and Node Protection", MPLS Traffic Engineering Path Link and Node Protection Configuration Guide, Cisco IOS XE Gibraltar 16.11.x, Jun. 2019, 38 pages. (Year: 2019).*

Vasseur et al., "MPLS Traffic Engineering Fast reroute:bypass tunnel path computation for bandwidth protection", draft-vasseur-mpls-backup-computation-02.txt, Feb. 2003, 53 pages.

Medagliani et al., "Global Optimization for Hash-based Splitting", 2016 IEEE Global Communications Conference (GLOBECOM), 2016, 6 pages.

* cited by examiner

FIG. 2

Before failure

Group table
(split ratios for demand 1)

| Group Id | Hash | Next-Hop |
|---|---|---|
| 1 | 0 | 56.78.91.1 |
| 1 | 1 | 56.78.91.2 |
| 1 | 2 | 56.78.91.2 |
| 1 | 3 | 56.78.91.3 | next-hop → 1/4, 1/2, 1/4

After failure (next hop 3)

Group table
(split ratios for demand 1)

| Group Id | Hash | Next-Hop |
|---|---|---|
| 1 | 0 | 56.78.91.1 |
| 1 | 1 | 56.78.91.2 |
| 1 | 2 | 56.78.91.2 |
| ~~1~~ | ~~3~~ | ~~56.78.91.3~~ | next-hop → 1/3, 2/3

1100

1101 — Receive configuration information from a controller, wherein the configuration information comprises a bandwidth threshold and a load balancing configuration for a tunnel, wherein the bandwidth threshold is configured to indicate to the network node to send a notification to the controller when traffic through the tunnel is above the bandwidth threshold, and the load balancing configuration is configured to indicate to the network node how to split the traffic through the tunnel among a plurality of paths of the tunnel in case of a failure 1102 — Send the notification to the controller, based on determining that the traffic of the tunnel is above the bandwidth threshold

FIG. 11

DEVICE AND METHOD FOR LOAD BALANCING

CROSS-REFERENCE TO RELATED APPLICATIONS

This application is a continuation of International Application No. PCT/CN2020/114620, filed on Sep. 10, 2020. The disclosures of the aforementioned application are hereby incorporated by reference in their entireties.

TECHNICAL FIELD

The embodiments relate to communication networks and load balancing of traffic in communication networks. In order to improve a network utilization, and to minimize traffic loss in case of failures, the embodiments propose a global configuration for a load balancing with protection. The embodiments may be concerned with load balancing traffic over multiple paths of a tunnel.

BACKGROUND

Load balancing plays a crucial role in improving network utilization. The main principle underlying load balancing is to split traffic over multiple paths, in order to make better use of a network capacity.

Nowadays, for example, software-defined networking (SDN) controllers or path computation elements (PCE) can integrate traffic engineering methods to continuously optimize routing and load balancing. These centralized control plane entities leverage a global view of the network, to decide whether it is necessary to split flows of traffic, and to decide the most efficient way to do the splitting, given some statistics on network load and traffic flows.

Load balancing (or flow splitting) may be implemented inside network elements, such as switches or routers, using two techniques: 1) hash-based splitting, where a hash is calculated over significant fields of packet headers, and is used to select the outgoing paths; and 2) weighted cost multi-pathing (WCMP), where load balancing weights are used to make sure that the number of flows on each outgoing path meets a certain ratio. In both cases, once a decision is taken for a flow, all packets from a flow may follow the same decision and, therefore, may follow the same path.

Conventional protection mechanisms (without load balancing) consider that a primary path is protected with one or several backup paths. A typical example is the so-called 1+1 protection, where traffic is fully duplicated over two paths. This class of solutions does not load balance traffic before and after a failure. This may lead to a high bandwidth utilization on some links or may make it impossible to protect the traffic due to a lack of resources.

A conventional method for protected load balancing considers one backup path for each primary sub-path involved in the load balancing of a tunnel. This mechanism is equivalent to the 1+1 protection in terms of bandwidth utilization and requires bandwidth reservations with multi-protocol label switching.

SUMMARY

In view of the above-mentioned disadvantages, the embodiments aim to introduce a centralized solution for traffic protection against a set of possible failures, when the traffic is load balanced over multiple paths of a tunnel. An objective may be to globally configure a safe load balancing by anticipating all possible load transfers that can happen in case of a failure in at least one of the paths. One aim is to make a more efficient use of bandwidth. Another aim is to minimize traffic loss, or to even achieve zero traffic loss, in case of failures.

A first aspect may provide a controller for protected load balancing in a network, where the network includes the controller and a plurality of network nodes, where the controller is configured to obtain traffic information of one or more tunnels in the network, where the traffic information of each tunnel is indicative of a protection type of the tunnel against one or more failures, and provide configuration information to each network node that is a head-end node of a determined tunnel with a certain protection type according to the obtained traffic information of the determined tunnel, where the configuration information includes a bandwidth threshold and a load balancing configuration for the determined tunnel, where the bandwidth threshold is configured to indicate to the network node to send a notification to the controller when traffic through the determined tunnel is above the bandwidth threshold (i.e., when the tunnel is not protected anymore), and the load balancing configuration is configured to indicate to the network node how to split the traffic through the determined tunnel among a plurality of paths of the determined tunnel in case of a failure.

The controller may be an SDN controller. The network nodes may be routers or switches. A tunnel is a channel between a source node (head-end network node) and a destination node (tail-end network node). A tunnel may be a collection of flows going from the same source node to the same destination node, and that are grouped together because they belong to the same application or tenant, or the same class of service.

An embodiment may enable load balancing with a built-in protection. The controller of the first aspect may "safely" load balance multiple paths through a tunnel, where "safely" means in view of an identified set of possible failures. Notably, a failure may be caused by at least one failing network component (such as a network node or a link between two network nodes) that is a part of a path through the tunnel.

An initial load balancing configuration may be set for the multiple paths of the tunnel (e.g., by the controller), where the initial load balancing configuration may define how a traffic flow is split over the paths of the tunnel, without the consideration of any failures. The controller may configure "safe" split ratios of the traffic over the multiple paths of the tunnel by the load balancing configuration, where the load balancing configuration provided by the controller considers failures. That is, the controller can set "safe" split ratios that allow, in case of a failure in a path of the tunnel, the other paths to carry the traffic through the tunnel without traffic loss.

As an example, a split ratio over three paths of a tunnel may determine how much (e.g., percentage) of the traffic each of the paths carries. This can be achieved by the load balancing configuration information provided by the controller to the head-end node of the tunnel (i.e., source node of a tunnel). Furthermore, instructing the head-end node to send the notification provides further protection, since it will be sent to the controller when the traffic through the tunnel is above the bandwidth threshold, and the tunnel is thus not protected anymore. The controller may be able to react to that circumstance, e.g., by applying more bandwidth to said tunnel, or by reconfiguring the traffic splitting.

In an implementation form of the first aspect, the traffic information of the one or more tunnels further includes a quality of service (QoS) requirement, and/or a traffic matrix including bandwidth estimations of the one or more tunnels.

The controller may receive input requirements related to traffic from end-users. The controller may receive traffic information for each tunnel, e.g., a different traffic information per tunnel. For instance, for each tunnel, parameters can be specified by the controller in the traffic information about one or more QoS requirements, such as end-to-end latency, a maximum loss, nodes/links inclusions or exclusions for traffic paths through the tunnel, etc. Further, information about source nodes and destination nodes of the tunnel may be included in the traffic information. The traffic matrix may carry information for a set of tunnels, particularly a bandwidth of each tunnel.

In an implementation form of the first aspect, the traffic information of the one or more tunnels is further configured to indicate a set of shared risk link groups (SRLGs), each SRLG including a plurality of links of the one or more tunnels.

Failures are typically identified by SRLGs. A SRLG identifies a set of links sharing a common resource, where the common resource may be an optical fiber or the like. It should be noted that, the term "link" discussed here refers to a direct link between two network nodes. Notably, a path or a routing path from a source node to a destination node may pass through multiple network nodes and may include multiple links. All links in the set of links will be affected, if the common resource fails. These links thus share the same risk of failure. That is, each SRLG includes a plurality of links of the one or more tunnels that may fail together.

In an implementation form of the first aspect, the controller is further configured to obtain network information, where the network information includes a topology of the network, and/or a characteristic of one or more links of the one or more tunnels, and determine the configuration information according to the obtained traffic information and the obtained network information.

The controller may also be aware of the network topology and/or link characteristics (e.g., capacity, background traffic, packet loss, delay, etc.). Based on all these inputs, the controller may periodically and globally adjust the load balancing of one or more tunnels.

In an implementation form of the first aspect, the load balancing configuration for the determined tunnel is further configured to indicate the plurality of paths of the determined tunnel, and a split ratio for each of the plurality of paths, and the load balancing configuration for the determined tunnel is further configured to indicate to the network node how to split the traffic through the determined tunnel among the plurality of paths, when the failure is a failure of one SLRG of the set of SLRGs intersecting the one or more paths of the determined tunnel.

Notably, when at least one link that is a part of at least one path through the tunnel fails, the at least one path will be affected by this failure. To ensure minimum traffic loss, the load balancing may be enforced at a head-end node of a tunnel by sending the load balancing configuration by the controller to the head-end node. The load balancing configuration may indicate a set of routing paths through the tunnel associated with the head-end node, with associated split ratios between the paths, where the split ratios are determined taking into account failures.

In an implementation form of the first aspect, the controller is further configured to calculate the split ratio for each path, using the obtained traffic information, such that a load of a path that is affected by the failure can be transferred to one or more other paths that are not affected.

The load of the affected path, i.e., the traffic that was carried over this path, may thus be cushioned (taken up) by the other paths. Algorithms may be used to calculate the split ratios for a set of tunnels. It should be noted that different algorithms may be chosen, but the objective of the calculation is that the traffic can still be routed after the failure, to avoid traffic loss. If bandwidth can be reserved on sub-paths, zero traffic loss may be ensured in case of a SRLG failure.

In an implementation form of the first aspect, the configuration information further includes bandwidth reservation information for one or more paths of the determined tunnel.

Optionally, if the network applies a multi-protocol label switching (MPLS) technique, bandwidth reservation information, e.g., how much of the available bandwidth of the one or more paths is reserved for the case of a failure, may be communicated to the network node as well. MPLS is a routing technique in telecommunications networks that directs data from one node to the next node based on short path labels rather than long network addresses. When MPLS is used, it is possible to reserve bandwidth for each sub-path to avoid traffic loss in case of failures.

In an implementation form of the first aspect, the bandwidth reservation information includes information on a bandwidth that is shared by the one or more paths, and/or information about a bandwidth that is for one path and not shared by other paths.

Possibly, the protection on a path, i.e., the reserved bandwidth, may be shared with other paths.

In an implementation form of the first aspect, the controller is further configured to receive one or more notifications from one or more of the network nodes, where each notification is configured to indicate that traffic through the one or more tunnels is above the bandwidth threshold or indicate a failure in the respective network node; and adjust the configuration information according to the received one or more notifications.

Optionally, the network node, such as the source node (head-end node) of a tunnel, monitors the protection status of the tunnel it is associated with, e.g., monitors a tunnel throughput, and/or a bandwidth utilization. Accordingly, the network node may further notify the controller for the sake of a global re-optimization of the load balancing.

In an implementation form of the first aspect, each notification includes one or more of: the failure; abnormal traffic information; tunnel bandwidth information; a current load balancing configuration; and a local bandwidth threshold of the respective network node.

Optionally, the notification sent by the network node may be an alert message.

In an implementation form of the first aspect, the controller is further configured to determine a protection status for the one or more tunnels according to the received one or more notifications, where the protection status of each tunnel is indicative of whether the tunnel is protected according to the protection type of the tunnel and provide the protection status of the one or more tunnels.

For instance, the controller may output the protection status for all of the tunnels (e.g., protected, not protected) to end-users.

In an implementation form of the first aspect, the controller is further configured to periodically adjust the configuration information according to the received one or more notifications and/or the obtained traffic information.

Based on all those inputs, the controller may periodically and globally adjust the configuration information.

A second aspect may provide a network node for protected load balancing in a network, where the network includes a controller and a plurality of network nodes, the network node is a head-end node of a tunnel in the network, where the network node is configured to: receive configuration information from the controller, where the configuration information includes a bandwidth threshold and a load balancing configuration for the tunnel, where the bandwidth threshold is configured to indicate to the network node to send a notification to the controller when traffic through the tunnel is above the bandwidth threshold, and the load balancing configuration is configured to indicate to the network node how to split the traffic through the tunnel among a plurality of paths of the tunnel in case of a failure; and send the notification to the controller, based on determining that the traffic through the tunnel is above the bandwidth threshold.

An embodiment may propose a network node for monitoring a local protection status of a tunnel of which it is the head-end node. Head-end node means it is the source node of the tunnel, i.e., the network node at which the tunnel starts. The network node may monitor the tunnel protection status based on a critical bandwidth level, i.e., based on the bandwidth threshold obtained from the controller. The network node sends the notification if the tunnel is not protected anymore. Further, according to the instructions of the tunnel (load balancing configuration), the network node can apply the above-described "safe" split ratios to its tunnel.

In an implementation form of the second aspect, the network node is further configured to send the notification to the controller, based on detecting a failure in the network node.

Optionally, an alert message may also be sent by the head-end node of the tunnel to the controller in case of a failure.

In an implementation form of the second aspect, the load balancing configuration for the tunnel is configured to indicate the plurality of paths of the tunnel and a split ratio for each of the plurality of paths, and the load balancing configuration for the tunnel is configured to indicate to the network node how to split the traffic through the tunnel among the plurality of paths, when the failure is a failure of a SLRG, intersecting the one or more paths of the tunnel, where the SLRG includes a plurality of links of the one or more tunnels.

Failures are typically identified by SRLGs. Links belonging to the same SRLG share the same risk of failure. Notably, if a path includes one SRLG link, the path also shares the same risk of failure.

In an implementation form of the second aspect, the network node is configured to split the traffic through the tunnel among the plurality of paths according to the split ratios included in the load balancing configuration for the tunnel.

Thus, the head-end node of the tunnel may apply the "safe" split ratios to the paths of its associated tunnel.

In an implementation form of the second aspect, the configuration information further includes bandwidth reservation information for one or more paths of the tunnel.

Optionally, if the network applies a MPLS technique, the network node may receive bandwidth reservation information as well.

In an implementation form of the second aspect, the bandwidth reservation information includes information on a bandwidth that is shared by the one or more paths, and/or information on a bandwidth that is for one path and not shared by other paths.

In an implementation form of the second aspect, the notification includes one or more of: the failure; abnormal traffic information; tunnel bandwidth information; a current load balancing configuration; and a local bandwidth threshold of the network node.

A third aspect may provide a user device for supporting protected load balancing in a network, where the network comprises a controller and a plurality of network nodes, where the user device is configured to: provide traffic information of one or more tunnels in the network to the controller, where the traffic information of each tunnel is indicative of a protection type of the tunnel against one or more failures; and obtain a protection status of the one or more tunnels from the controller, where the protection status of each tunnel is indicative of whether the tunnel is protected according to the protection type of the tunnel.

An embodiment may propose a user device for providing input regarding traffic associated with a set of tunnels to the controller and obtaining from the controller information regarding the protection status for all the tunnels. With the traffic information for the one or more tunnels, the user device may request a protection type for each tunnel. The user device may delay sending the traffic, until receiving confirmation that the protections status of the one or more tunnels matches the provided/requested protection type.

In an implementation form of the third aspect, the traffic information of the one or more tunnels further includes a quality of service requirement, and/or a traffic matrix including bandwidth estimations of the one or more tunnels.

Thus, the user device may indicate what QoS is required per tunnel, and what bandwidth it estimates is required per tunnel.

In an implementation form of the third aspect, the traffic information of the one or more tunnels further indicates a set of SRLG, each SRLG including a plurality of links of the one or more tunnels.

In an implementation form of the third aspect, the one or more failures includes a failure of one SLRG in the set of SLRGs intersecting the one or more paths of a tunnel.

A fourth aspect may provide a method for protected load balancing in a network, where the network includes a controller and a plurality of network nodes, where the method includes the following steps executed by the controller: obtaining traffic information of one or more tunnels in the network, where the traffic information of each tunnel is indicative of a protection type of the tunnel against one or more failures; and providing configuration information to each network node that is a head-end node of a determined tunnel with a certain protection type, according to the obtained traffic information of the determined tunnel, where the configuration information includes a bandwidth threshold and a load balancing configuration for the determined tunnel, where the bandwidth threshold is configured to indicate to the network node to send a notification to the controller when traffic through the determined tunnel is above the bandwidth threshold, and the load balancing configuration is configured to indicate to the network node how to split the traffic through the determined tunnel among a plurality of paths of the determined tunnel in case of a failure.

Implementation forms of the method of the fourth aspect may correspond to the implementation forms of the controller of the first aspect described above. The method of the fourth aspect and its implementation forms may achieve the same advantages and effects as described above for the controller of the first aspect and its implementation forms.

A fifth aspect may provide a method for protected load balancing in a network, where the network includes a controller and a plurality of network nodes, where the method includes the following steps executed by a network node, where the network node is a head-end node of a tunnel in the network: receiving configuration information from the controller, where the configuration information includes a bandwidth threshold and a load balancing configuration for the tunnel, where the bandwidth threshold is configured to indicate to the network node to send a notification to the controller when traffic through the tunnel is above the bandwidth threshold, and the load balancing configuration is configured to indicate to the network node how to split the traffic through the tunnel among a plurality of paths of the tunnel in case of a failure; and sending the notification to the controller, based on determining that the traffic of the tunnel is above the bandwidth threshold.

Implementation forms of the method of the fifth aspect may correspond to the implementation forms of the network node of the second aspect described above. The method of the fifth aspect and its implementation forms may achieve the same advantages and effects as described above for the network node of the second aspect and its implementation forms.

A sixth aspect may provide a method for protected load balancing in a network, where the network includes a controller and a plurality of network nodes, where the method includes the following steps executed by a user device for supporting protected load balancing: providing traffic information of one or more tunnels in the network to the controller, where the traffic information of each tunnel is indicative of a protection type of the tunnel against one or more failures; and obtaining a protection status of the one or more tunnels from the controller, where the protection status of each tunnel is indicative of whether the tunnel is protected according to the protection type of the tunnel.

Implementation forms of the method of the sixth aspect may correspond to the implementation forms of the user device of the third aspect described above. The method of the sixth aspect and its implementation forms may achieve the same advantages and effects as described above for the user device of the third aspect and its implementation forms.

A seventh aspect may provide a computer program product including program code for carrying out, when implemented on a processor, the method according to the fourth aspect and any implementation forms of the fourth aspect, the fifth aspect and any implementation forms of the fifth aspect, or the sixth aspect and any implementation forms of the sixth aspect.

Devices, elements, units and the like could be implemented in software or hardware elements or any kind of combination thereof. All steps which are performed by the various entities as well as the functionalities described to be performed by the various entities are intended to mean that the respective entity is adapted to or configured to perform the respective steps and functionalities. Even if, in the following description of the embodiments, a functionality or step to be performed by external entities is not reflected in the description of a detailed element of that entity which performs that step or functionality, it should be clear for a skilled person that these methods and functionalities can be implemented in respective software or hardware elements, or any kind of combination thereof.

BRIEF DESCRIPTION OF THE DRAWINGS

The above described aspects and implementation forms will be explained in the following description of embodiments in relation to the enclosed drawings, in which:

FIG. 2 shows a load transfer after a failure;

FIG. 11 shows another method according to an embodiment; and

DETAILED DESCRIPTION OF THE EMBODIMENTS

Illustrative embodiments of a controller, network node, user device, and corresponding methods for efficient packet transmission in a communication system are described with reference to the figures. Although this description provides a detailed example of possible implementations, it should be noted that the details are intended to be exemplary and in no way limit the scope of the embodiments.

Moreover, an embodiment/example may refer to other embodiments/examples. For example, any description including, but not limited to, terminology, element, process, explanation and/or advantage mentioned in one embodiment/example is applicative to the other embodiments/examples.

In a hash-based splitting technology, it is possible to distinguish between even or uneven flow splitting. The first type is the more popular one and is also known as Equal Cost Multi-Paths (ECMP). The second type allows a better utilization of the network resources, but it is harder to implement. The second type is also known as Unequal Cost Multi-Paths (UCMP). In both cases, the implementation inside switches can leverage on a Ternary Content Access Memory (TCAM) memory for efficient packet processing. The TCAM memory inside the switches may be further divided into two tables: the forwarding table and the group table, as shown in FIG. 1.

Figure 1:
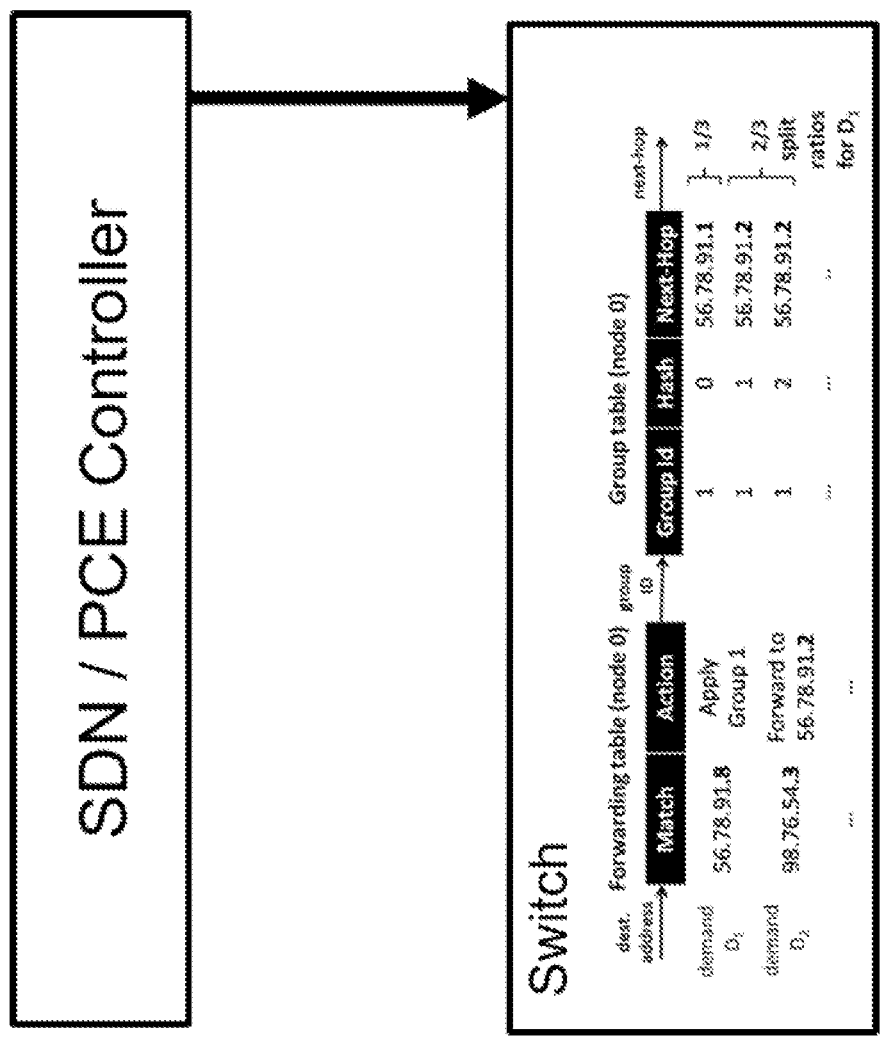
FIG. 1 shows a network and switch architecture using a hash-based load balancing.

FIG. 1 shows a network and switch architecture using a hash-based load balancing, the switch being controlled by an SDN or PCE controller. For each incoming packet, the switch looks for the corresponding match of the packet's destination address in the forwarding table, which specifies whether the packet can be directly forwarded, or whether a specific traffic split must be respected, i.e., a certain path may need to be selected for the packet (e.g., a flow that the packet belongs to may be routed over another path than another flow). In the latter case, the switch further looks for the corresponding entry of the group table associated with the action of splitting the traffic(here a group with group ID 1). For instance, as shown in FIG. 1, for demand $D_1$ (e.g., the demand may be a traffic flow through a tunnel from a source node to a destination node of the tunnel), the switch finds in the forwarding table that the corresponding "Action" is "Apply Group 1". Accordingly, the switch further finds a group with "Group ID" 1 in the group table. Then, according to the output of the value of a hash computed over one or more fields of packets, over a header of the packet, the next hop for the packet may be determined. The configuration of entries in the group table is also called buckets, and defines split ratios for splitting the traffic, i.e., defines a load balancing, which may be used for a specific flow of the traffic. Given the global view of the network, the SDN or PCE controller can instruct each switch with an appropriate TCAM configuration.

FIG. 2 shows an example of a load transfer after a failure. When a next hop associated with a certain flow fails, associated buckets are removed, split ratios are automatically adjusted, and the load is automatically transferred to remaining buckets. In this example, when the link associated with the next-hop 56.78.91.3 fails, the load is transferred to the remaining next-hops. Accordingly, split ratios for the flow, corresponding to the remaining next-hops, are modified from (¼, ½) to (⅓, ⅔).

A protection mechanism may be implemented on top of UCMP. It safely adjusts and monitors load balancing to improve network utilization and protect traffic against an identified set of failures. An objective may be to globally configure a safe load balancing (i.e., configure split ratios for all tunnels) by anticipating all the possible load transfers that can happen in case of failures.

The embodiments may consider load balancing with a built-in protection, without distinction of primary or backup paths. This is to make a more efficient use of bandwidth compared to traditional protection mechanisms; to ensure minimum traffic loss when bandwidth reservations are not used; and to even zero traffic loss when bandwidth reservation are used. In reality, it is possible that packets inside the network could be lost in case of failure. But the subsequent packets reaching the load balancer (i.e., the entity performing load balancing) after the reconfiguration of split ratios, will not face any congestion in case bandwidth has been reserved.

A first part may be implemented by a controller, for instance, a protected load balancing module in the controller; the second part may be implemented in devices, i.e., network nodes, to monitor the protection and notify the centralized controller for the sake of a global re-optimization.

Figure 3:
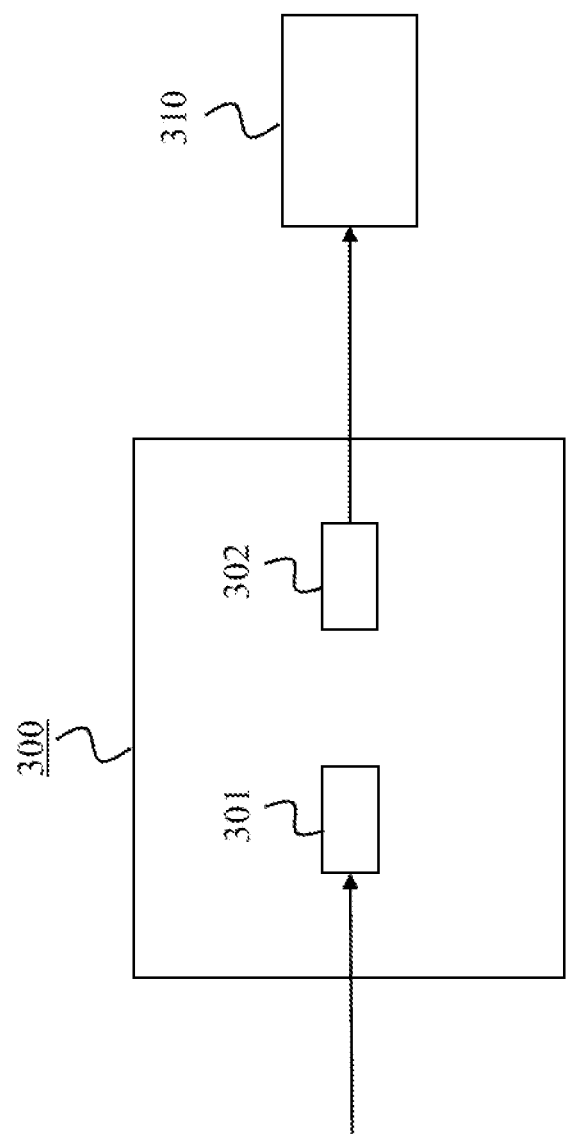
FIG. 3 shows a controller according to an embodiment.

FIG. 3 shows a controller 300 adapted for protected load balancing in a network according to an embodiment. The controller 300 may include processing circuitry (not shown) configured to perform, conduct, or initiate the various operations of the controller 300 described herein. The processing circuitry may include hardware and software. The hardware may include analog circuitry or digital circuitry, or both analog and digital circuitry. The digital circuitry may include components such as application-specific integrated circuits (ASICs), field-programmable arrays (FPGAs), digital signal processors (DSPs), or multi-purpose processors. The controller 300 may further include memory circuitry, which stores one or more instruction(s) that can be executed by the processor or by the processing circuitry, under control of the software. For instance, the memory circuitry may include a non-transitory storage medium storing executable software code which, when executed by the processor or the processing circuitry, causes the various operations of the controller 300 to be performed. In one embodiment, the processing circuitry includes one or more processors and a non-transitory memory connected to the one or more processors. The non-transitory memory may carry executable program code which, when executed by the one or more processors, causes the controller 300 to perform, conduct or initiate the operations or methods described herein.

The network may include the controller 300 and a plurality of network nodes 310. The controller 300 is configured to obtain traffic information 301 of one or more tunnels in the network. Notably, a tunnel establishes a channel between a source node and a destination node in the network. A network node 310 maybe a head-end node of a tunnel in the network. Data/packets being transmitted in a tunnel may have different routing paths. The traffic information 301 of each tunnel may indicate a protection type of the tunnel against one or more failures. For instance, the protection type may include: no protection (the tunnel is not protected against failure), or protected load balancing against a certain failure (the tunnel is protected against an identified set of failures).

Further, the controller 300 is configured to provide configuration information 302 to each network node 310, which is a head-end node of a determined tunnel with a certain protection type, according to the obtained traffic information 301 of the determined tunnel. Notably, for each tunnel there are a source/head-end node and a destination/tail-end node. A head-end node may be a router, on which a traffic in a tunnel is configured, and a tail-end node may be a router, on which the tunnel terminates. If it is known to the controller 300 that a determined tunnel is or should be, a protected tunnel, the controller 300 may provide the related configuration information 302 to the head-end node of the determined tunnel. The configuration information 302 includes ses at least a bandwidth threshold and a load balancing configuration for the determined tunnel. Further, the bandwidth threshold indicates the network node 310 to send a notification 311 to the controller 300, when traffic through the determined tunnel is above the bandwidth threshold. The bandwidth threshold may thus also be referred to as critical bandwidth level. If the traffic through the determined tunnel is above the bandwidth threshold, the tunnel is not protected anymore. That is, the notification 311 may thus be an alert message. The load balancing configuration indicates the network node 310 how to split the traffic through the determined tunnel among a plurality of paths of the determined tunnel in case of a failure. The network node 300 may route the traffic through the tunnel over the plurality of paths according to split ratios indicated by the split based on the load balancing configuration received from the controller 300.

Optionally, according to an embodiment, the traffic information 301 of the one or more tunnels may further includes a QoS requirement, and/or a traffic matrix including bandwidth estimations of the one or more tunnels. The traffic matrix may include information of a peak-bandwidth and/or an average bandwidth of the one or more tunnels.

According to an embodiment, the traffic information of the one or more tunnels may further indicate a set of SRLG. Each SRLG may include a plurality of links of the one or more tunnels.

Failures are typically identified by SRLGs. A SRLG identifies a set of links that shares a common resource. All the links in the set will be affected if the common resource fails. These links, which share the same risk of failure, are therefore considered to belong to the same SRLG. For instance, in a network with 3 links A, B and C, all possible one-link failures can be considered by considering the SRLG groups {{A}, {B}, {C}}, and all possible two-links failures can be considered by considering the SRLG groups {{AB}, {AC}, {BC}}.

Safely load balancing may cover a given set of SLRG failures. "Safe" split ratios may be configured to avoid traffic loss in case of any possible SRLG failure. If bandwidth can be reserved on sub-paths, zero traffic loss can be ensured. The controller 300 can ensure that such protection is provided over at least a certain time period and can react if needed.

Figure 4:
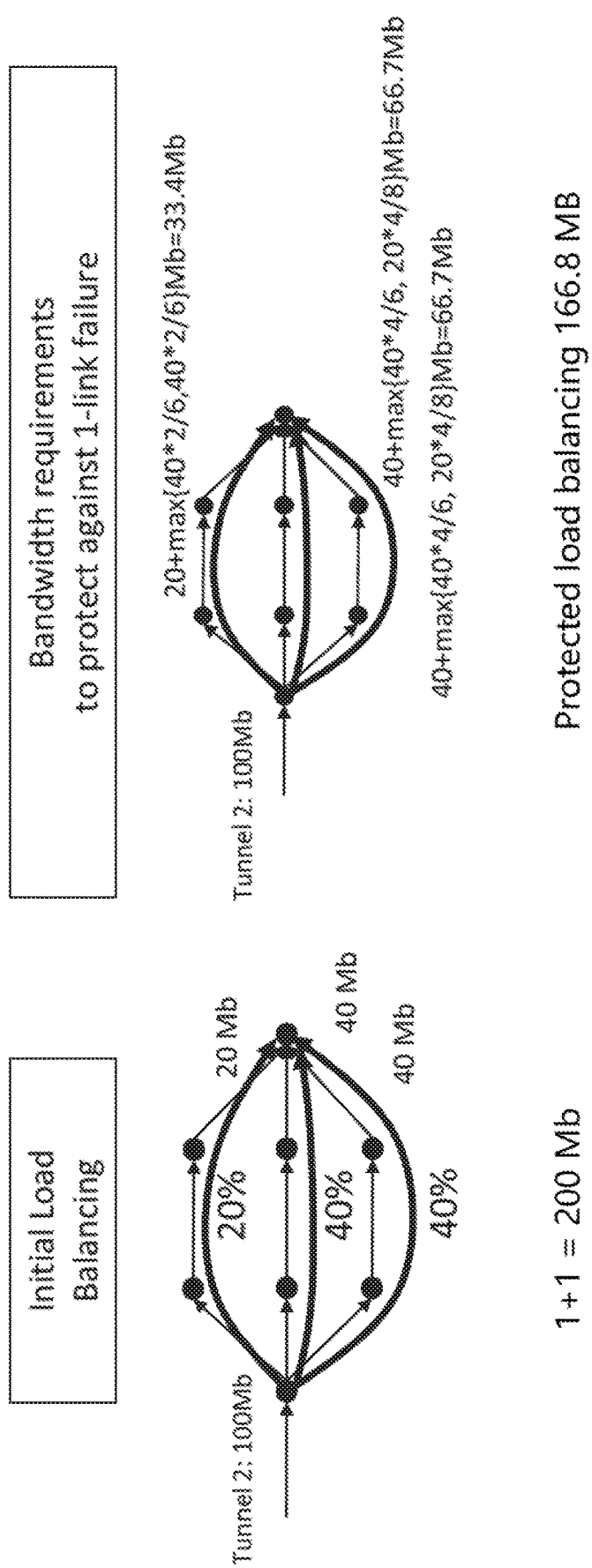
FIG. 4 shows an initial load balancing and a protected load balancing according to an embodiment.

FIG. 4 shows an example of splitting traffic in a tunnel, according to an embodiment to protect better against failures. It may be shown how to apply split ratios for a tunnel of an exemplary size of 100 Mb. The tunnel is split over three paths, in order to protect against all possible one-link failures. In this example, the number of SRLGs is equal to the number of links. For example, the load balancing is initially (e.g., conventionally) assigned to be 20%, 40%, 40% (as shown in FIG. 4 on the left side) on the three paths. It can be calculated, e.g., by the controller 300, how much bandwidth will be utilized in the worst-case failure scenario for this initial (conventional) load balancing. In this example, the worst-case utilization is calculated to be 33.4 Mb, 66.7 Mb, 66.7 Mb on the three paths, when considering all possible one-link failures. The maximum function (as shown in FIG. 4) allows to consider the worst-case failure scenario for each path through the tunnel, in the computation of the required bandwidth, among all possible SRLG failures out of the considered path. Split ratios between the paths based on these calculations can then be applied by the controller 300 to protect better against these kinds of failures. Notably, the controller 300 may take into account the capacity of links, when calculating these "safe" split ratios. Optionally, a protected load balancing module installed in the controller 300 may perform the calculation.

From this example, the proposed protection mechanism may be more efficient than, for instance, the conventional 1+1 protection (where traffic is fully duplicated over two paths, i.e., twice the size of the tunnel is needed), as the proposed protection mechanism consumes only 166.8 Mb of bandwidth in total instead 200 Mb that would be consumed by 1+1 protection.

Figure 5:
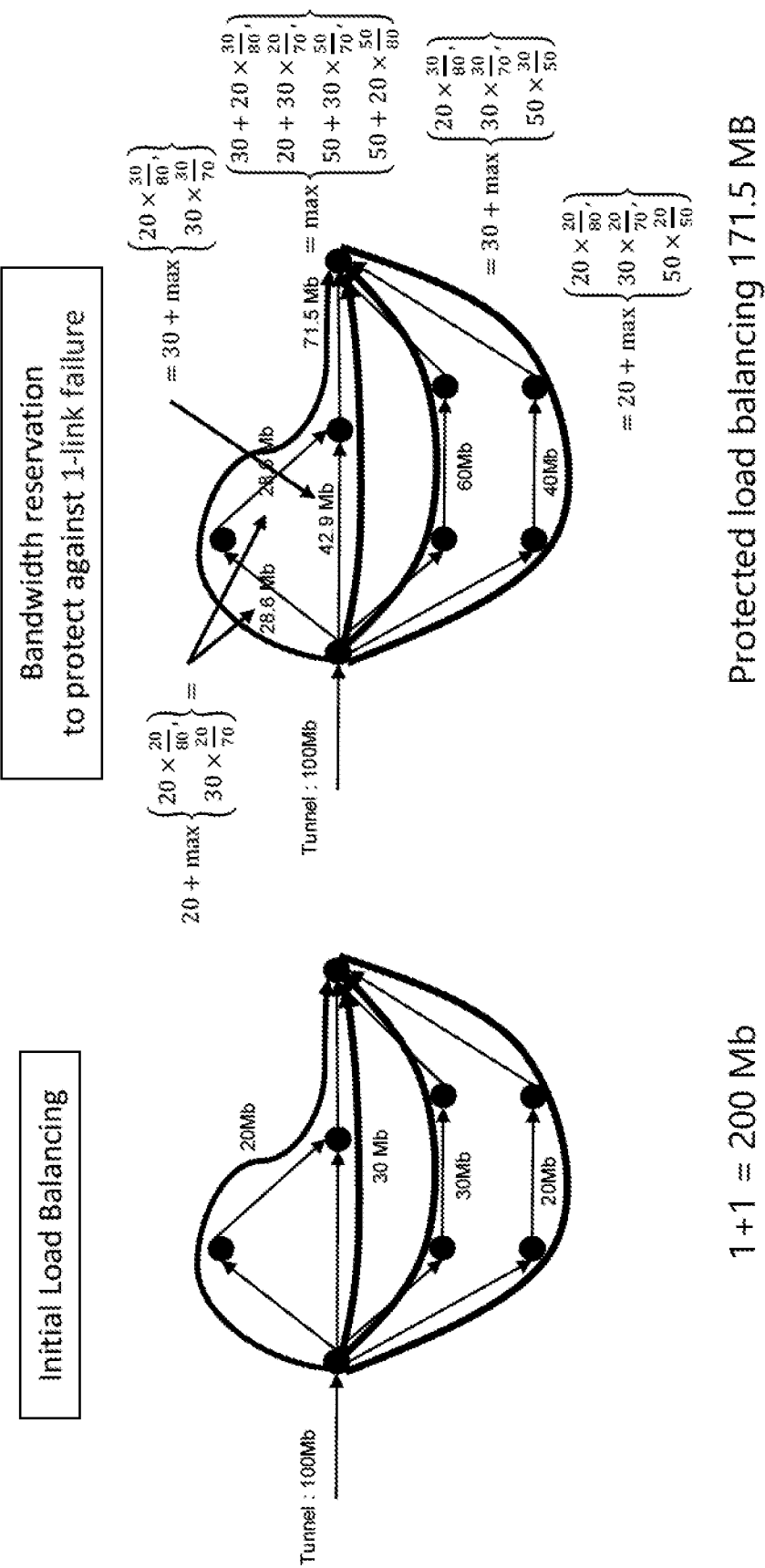
FIG. 5 shows an initial load balancing and a protected load balancing according to an embodiment.

FIG. 5 shows another example of how to split traffic in a tunnel, according to an embodiment. Traffic splitting may be performed in a network node 310. The network node 310 may obtain the split ratios from the configuration information 301 provided by the controller 300. In this example, the tunnel has a size of 100 Mb, and it is split over four paths in order to protect against all possible one-link failures. As discussed with respect to FIG. 4, the number of SRLGs is equal to the number of links. When the load balancing is initially 20%, 30%, 30%, 20% (as shown in FIG. 5 on the left side) on the four paths, the bandwidth needed in the worst-case failure scenario can be calculated, e.g., by the controller 300 (as shown in FIG. 5 on the right side). Similar as shown in FIG. 4, the maximum function shown in FIG. 5 allows to consider the worst-case failure scenario for a considered path, in the computation of the required bandwidth, among all possible SRLG failures out of the considered path. In this embodiment, it can be observed that this proposed protection mechanism consumes 171.5 Mb of bandwidth in total, instead of 200 Mb for 1+1 protection.

Furthermore, it should be noted that in both the embodiments shown in FIG. 4 and FIG. 5, the protection is valid for a given bandwidth requirement of the tunnel. That is, if the traffic goes above the exemplary 100 Mb in the tunnel, the traffic may not be protected anymore. To solve this issue, a "critical bandwidth level" may be used and monitored for each tunnel. When traffic inside the tunnel is above the critical bandwidth level, or when not enough remaining bandwidth is available in the network due to background traffics, the network node 310 (or a load balancer inside the network node 310) can notify the controller 300 so that load balancing is reconfigured.

In an embodiment, the following algorithm may be used to calculate split ratios for a set of tunnels in the controller 300.

Algorithm:

Considering a set of SRLG disjoint paths $P_k$ for each tunnel k (paths which are not sharing links from the same SLRG)

Let $min_{BW}$ be the minimum percentage of tunnel bandwidth to assign on a path (e.g. /1;16)

For every tunnel k

Assign $min_{BW}$ to each paths of $P_k$

While split ratios can still been modified

Evaluate the protection bandwidth $w_{pk}$ required to protect against SRLG failures when the utilization is increased by $min_{BW}$ on path p For $w_{pk}$ with the minimum value, add $min_{BW}$ for tunnel k on the first path p if there is enough remaining capacity If the sum of the assigned split ratio of tunnel k is less than 1, then remove all split ratios associated with the tunnel k Return the split ratio for each path and each tunnel.

Optionally, evaluate and return the bandwidth reservation for each path.

Figure 6:
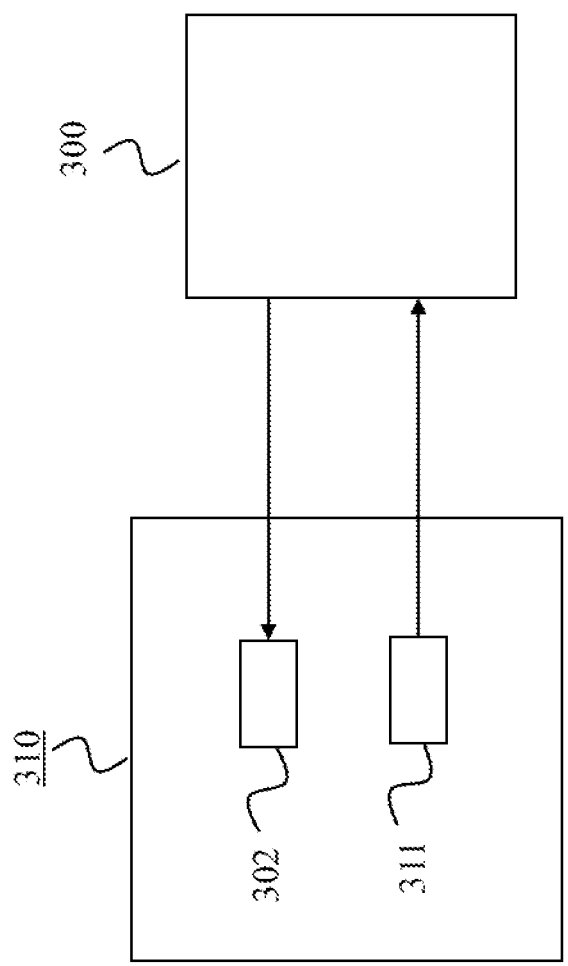
FIG. 6 shows a network node according to an embodiment.

FIG. 6 shows a network node 310 adapted for protected load balancing in a network according to an embodiment. The network node 310 may include processing circuitry (not shown) configured to perform, conduct, or initiate the various operations of the network node 310 described herein. The processing circuitry may include hardware and software. The hardware may include analog circuitry or digital circuitry, or both analog and digital circuitry. The digital circuitry may include components such as application-specific integrated circuits (ASICs), field-programmable arrays (FPGAs), digital signal processors (DSPs), or multi-purpose processors. The network node 310 may further include memory circuitry, which stores one or more instruction(s) that can be executed by the processor or by the processing circuitry, under control of the software. For instance, the memory circuitry may include a non-transitory storage medium storing executable software code which, when executed by the processor or the processing circuitry, causes the various operations of the network node 310 to be performed. In one embodiment, the processing circuitry includes one or more processors and a non-transitory memory connected to the one or more processors. The non-transitory memory may carry executable program code which, when executed by the one or more processors, causes network node 310 to perform, conduct or initiate the operations or methods described herein.

The network may include a controller 300 and a plurality of network nodes 310. The network node 310 is a head-end node of a tunnel in the network, where the network node 310 is configured to receive configuration information 302 from the controller 300. The configuration information 302 may include a bandwidth threshold and a load balancing configuration for the tunnel. The bandwidth threshold indicates the network node 310 to send a notification 311 to the controller 300 when traffic through the tunnel is above the bandwidth threshold. This bandwidth threshold may also be referred to as critical bandwidth level. The load balancing configuration indicates the network node 310 how to split the traffic through the tunnel among a plurality of paths of the tunnel in case of a failure.

Further, if it is determined that the traffic of the tunnel is above the bandwidth threshold, the network node 310 is configured to send the notification 311 to the controller 300. In this way, the network node 310 can notify the controller 300 that the tunnel is not protected anymore, so that load balancing can be reconfigured. Optionally, the network node 310 may further be configured to send the notification 311 to the controller if a failure is detected in the network node 310.

Figure 7:
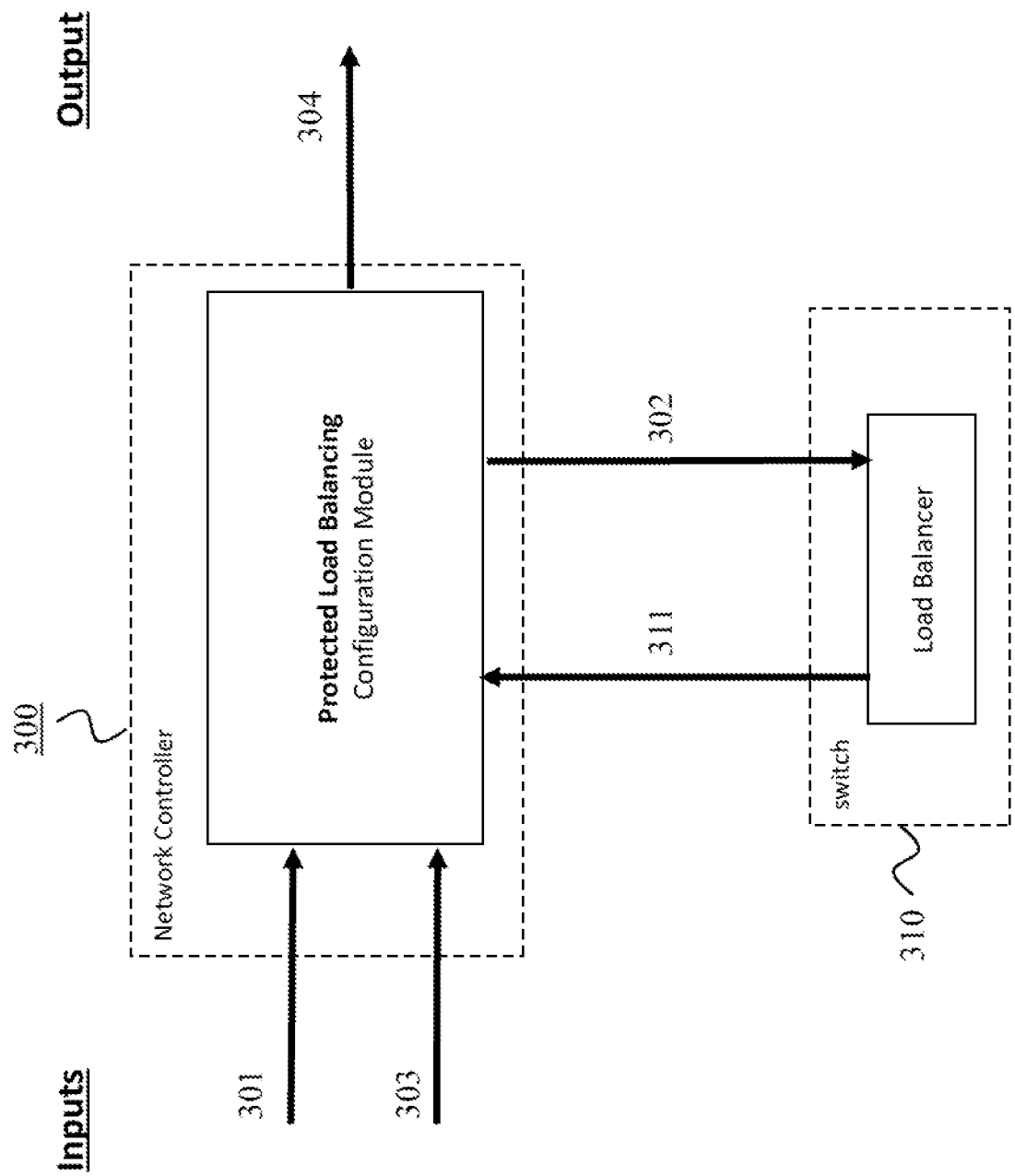
FIG. 7 shows a protected load balancing architecture according to an embodiment.

FIG. 7 depicts a system architecture according to an embodiment. This architecture includes a controller 300 and a network node 310. The controller 300 may the controller shown in FIG. 3, and the network node 310 may the network node shown in FIG. 6.

As shown in FIG. 7, the controller 300 may include a protected load balancing configuration module. The protected load balancing configuration module may receive inputs related to a set of tunnels, for instance, from end-users. For each tunnel, a protection type may be defined (e.g., no protection, or protected load balancing) and a set of SRLG failures may be given. Other parameters can be specified, e.g., concerning QoS requirements, such as end-to-end latency, loss, nodes/links inclusions or exclusions, etc. The protected load balancing configuration module may also be aware of the network topology and link characteristics (e.g., capacity, background traffic, packet loss, delay, etc.). Based on all these inputs, the protected load balancing configuration module may periodically and globally adjust the load balancing of the tunnels. Notably, the load balancing may be enforced at head-ends of the tunnels by sending to devices a set of routing paths with associated split ratios.

Optionally, according to an embodiment, the controller 300 may be further configured to obtain network information 303, where the network information 303 includes a topology of the network, and/or a characteristic of one or more links of the one or more tunnels. Further, the controller 300 may be configured to determine the configuration information 302 according to the obtained traffic information 301 and the obtained network information 303.

In the case of protected load balancing, i.e., the traffic information 301 indicates that one of more tunnels are protected against certain failures, a critical bandwidth is communicated to the network node 310, so that the network node 310 can monitor the protection status. The network node 310 may be a switch or a router.

The load balancing configuration for the determined tunnel may indicate the plurality of paths of the determined tunnel and may indicate a split ratio for each of the plurality of paths. Optionally, the load balancing configuration for the determined tunnel is used to indicate the network node 310 how to split the traffic through the determined tunnel among the plurality of paths, in case that the failure is a failure of one SLRG of the set of SLRGs intersecting the one or more paths of the determined tunnel.

Accordingly, the network node 310 may be configured to split the traffic through the tunnel among the plurality of paths according to the split ratios included in the load balancing configuration for the tunnel. To this end, the network node 310 may include a load balancer.

Optionally, the controller 300 may be further configured to calculate the split ratio for each path, using the obtained traffic information 301, such that a load of a path that is affected by the failure can be transferred to one or more other paths that are not affected.

Notably, different algorithms may be used to calculate split ratios for a set of tunnels. It should be noted that, the objective of the calculation is that the traffic can still be routed after the failure to avoid traffic loss.

Optionally, according to an embodiment, the configuration information 302 may further include bandwidth reservation information for one or more paths of the determined tunnel. When bandwidth reservation is used, for instance if MPLS technique is used, zero traffic loss may be ensured in case of SRLG failures. Possibly, the bandwidth reservation information may include information about a bandwidth that is shared by the one or more paths, and/or information about a bandwidth that is for one path and not shared by other paths.

Notably, MPLS is a routing technique in telecommunications networks that directs data from one node to the next based on short path labels rather than long network addresses, thus avoiding complex lookups in a routing table and speeding traffic flows. The labels identify virtual links (paths) between distant nodes rather than endpoints. MPLS can encapsulate packets of various network protocols, hence the "multiprotocol" reference on its name MPLS supports a range of access technologies. When MPLS is used, an explicit bandwidth reservation can be enforced on each sub-path so that zero traffic loss occurs in case of failure. When Segment Routing over IPv6 data plane (SRv6) technique is used, no bandwidth reservations can be implemented, the controller 300 may just steering traffic in such a way that minimum loss occurs in case of failures.

Optionally, the controller 300 according to an embodiment may be further configured to receive one or more notifications 311 from one or more of the network nodes 310. Each notification 311 may indicate that the one or more tunnels are not protected because traffic through a respective network node 310 is above the bandwidth threshold or may indicate a failure in the respective network node 310. Further, the controller 300 may be further configured to adjust the configuration information 302 according to the received one or more notifications 311.

Possibly, according to an embodiment, each notification 311 includes one or more of: the failure; abnormal traffic information; tunnel bandwidth information; a current load balancing configuration; and a local bandwidth threshold of the respective network node.

Further, according to an embodiment, the controller 300 may be further configured to determine a protection status 304 for the one or more tunnels according to the received one or more notifications 311. The protection status 304 of each tunnel is indicative of whether the tunnel is protected according to the protection type of the tunnel. Then, the controller 300 may be further configured to provide the protection status 304 of the one or more tunnels, for instance to end-user devices.

Based on all inputs, the controller 300 may be further configured to periodically adjust the configuration information 302 according to the received one or more notifications and/or the obtained traffic information 301.

Figure 8:
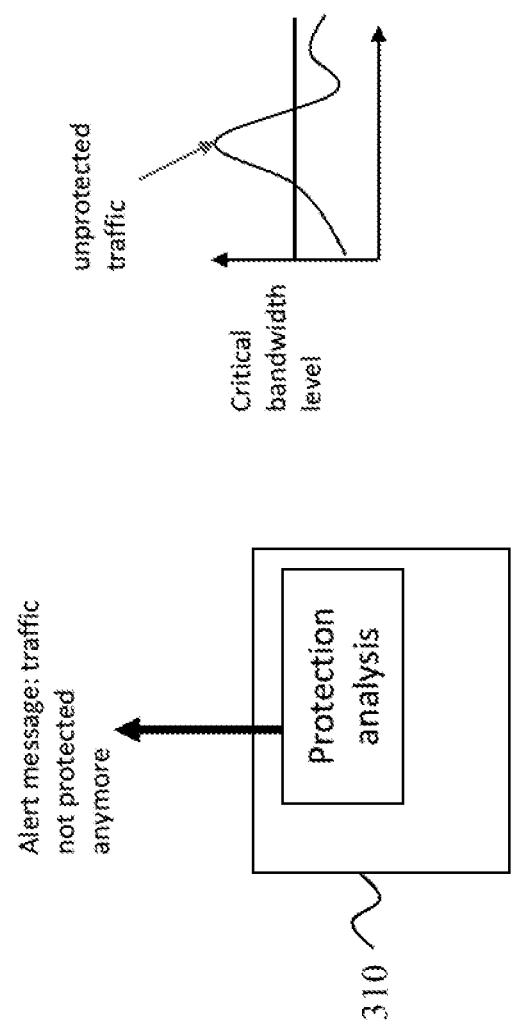
FIG. 8 shows a network node according to an embodiment.

FIG. 8 depicts a network node 310 and a protection analysis module in the network node 310 according to an embodiment. The network node 310 may implement the protection analysis module, as shown in FIG. 8. The network node 310, or the protection analysis module in the network node 310, may observe real-time traffic and may trigger an alert when the traffic goes above the critical bandwidth level. It should be noted that thereby the traffic can be sampled. In addition, timers may be added to avoid notifying the controller 300 several consecutive times. In addition, the protection analysis module can also notify the controller 300 about failures, so that the controller 300 can react. In case that the traffic is above the critical bandwidth level, or in case of a failure, the alert message sent to the controller 300 may include information about the nature of a load balancing issue (e.g., failure, abnormal traffic), the tunnel bandwidth information (e.g., average and peak rate), the current load balancing configuration (split ratios on each path) and the local critical bandwidth level (in case it has been updated/modified locally). Notably, the alert message can be implemented on top of the PCE Communication Protocol (PCEP), as a Simple Network Management Protocol (SNMP) trap, or with Network Configuration Protocol (NetConf).

Optionally, a user device may provide inputs of traffic information to the controller 300 and obtain the protection status 304 of tunnels. At any time, the protected load balancing module in the controller 300 can output to end-users the protection status 304 for all tunnels (e.g., protected, not protected).

Figure 9:
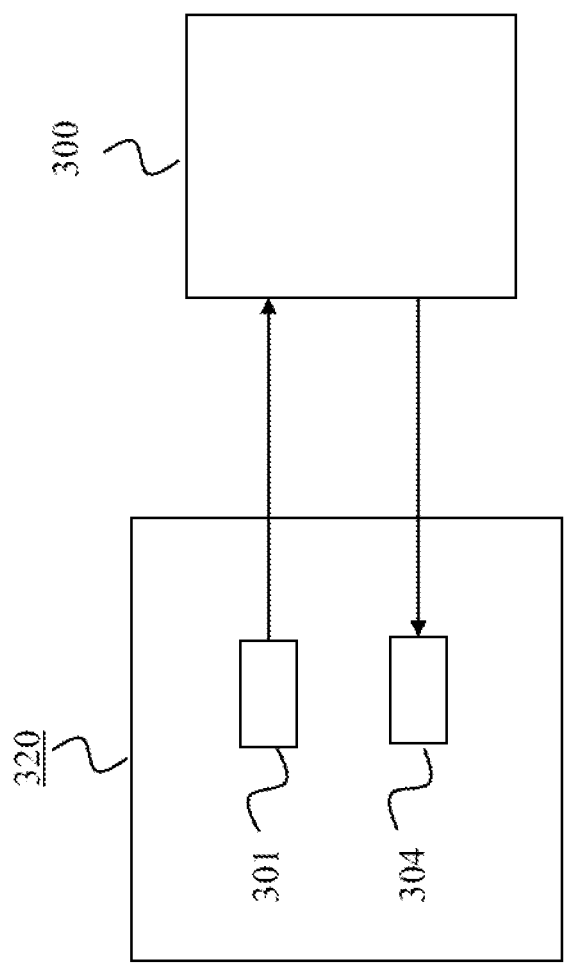
FIG. 9 shows a user device according to an embodiment.

FIG. 9 shows a user device 320 adapted for supporting protected load balancing in a network according to an embodiment. The network may include a controller 300 and a plurality of network nodes 310. In an implementation, the controller 300 may be the controller shown in FIG. 3, and one or more network nodes 310 may be the network node shown in FIG. 6.

The user device 320 is configured to provide traffic information 301 of one or more tunnels in the network to the controller 300, where the traffic information 301 of each tunnel indicates a protection type of the tunnel against one or more failures. Further, the user device 320 is configured to obtain a protection status 304 of the one or more tunnels from the controller 300, where the protection status 304 of each tunnel is indicative of whether the tunnel is protected according to the protection type of the tunnel.

Figure 10:
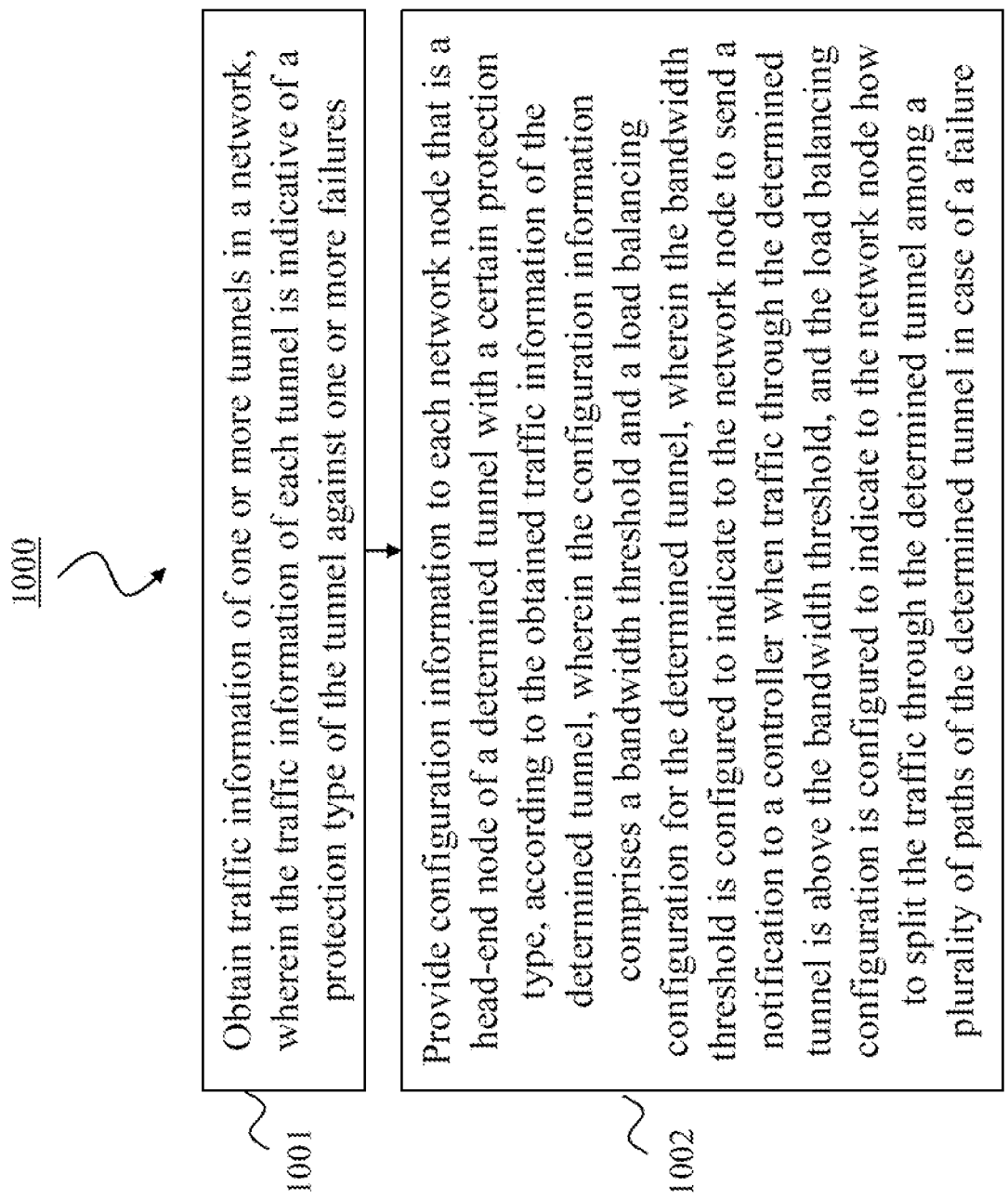
FIG. 10 shows a method according to an embodiment.

FIG. 10 shows a method 1000 according to an embodiment for protected load balancing in a network. The network may includes a controller 300 and a plurality of network nodes 310. In an embodiment, the method 1000 is performed by the controller 300 shown in FIG. 3. The method 1000 includes a step 1001 of obtaining traffic information 301 of one or more tunnels in the network, where the traffic information 301 of each tunnel is indicative of a protection type of said tunnel against one or more failures. The method 1000 further includes a step 1002 of providing configuration information 302 to each network node 310 that is a head-end node of a determined tunnel with a certain protection type, according to the obtained traffic information 301 of the determined tunnel, where the configuration information 302 includes a bandwidth threshold and a load balancing configuration for the determined tunnel, where the bandwidth threshold is configured to indicate to the network node 310 to send a notification 311 to the controller 300 when traffic through the determined tunnel is above the bandwidth threshold, and the load balancing configuration is configured to indicate to the network node 310 how to split the traffic through the determined tunnel among a plurality of paths of the determined tunnel in case of a failure. Possibly, the network node 310 is the network node shown in FIG. 6 or FIG. 7.

FIG. 11 shows a method 1100 according to an embodiment for protected load balancing in a network. The network may include a controller 300 and a plurality of network nodes 310. In an embodiment, the method 1100 may be performed by a network node 310 shown in FIG. 6. The network node 310 may be a head-end node of a tunnel in the network. The method 1100 includes a step 1101 of receiving configuration information 302 from the controller 300, where the configuration information 302 includes a bandwidth threshold and a load balancing configuration for the tunnel, where the bandwidth threshold is configured to indicate to the network node 310 to send a notification 311 to the controller 300 when traffic through the tunnel is above the bandwidth threshold, and the load balancing configuration is configured to indicate to the network node 310 how to split the traffic through the tunnel among a plurality of paths of the tunnel in case of a failure. The method 1100 further includes a step 1102 of sending the notification 311 to the controller 300, if it is determined that the traffic of the tunnel is above the bandwidth threshold. Possibly, the controller 300 is the controller shown in FIG. 3 or FIG. 7.

Figure 12:
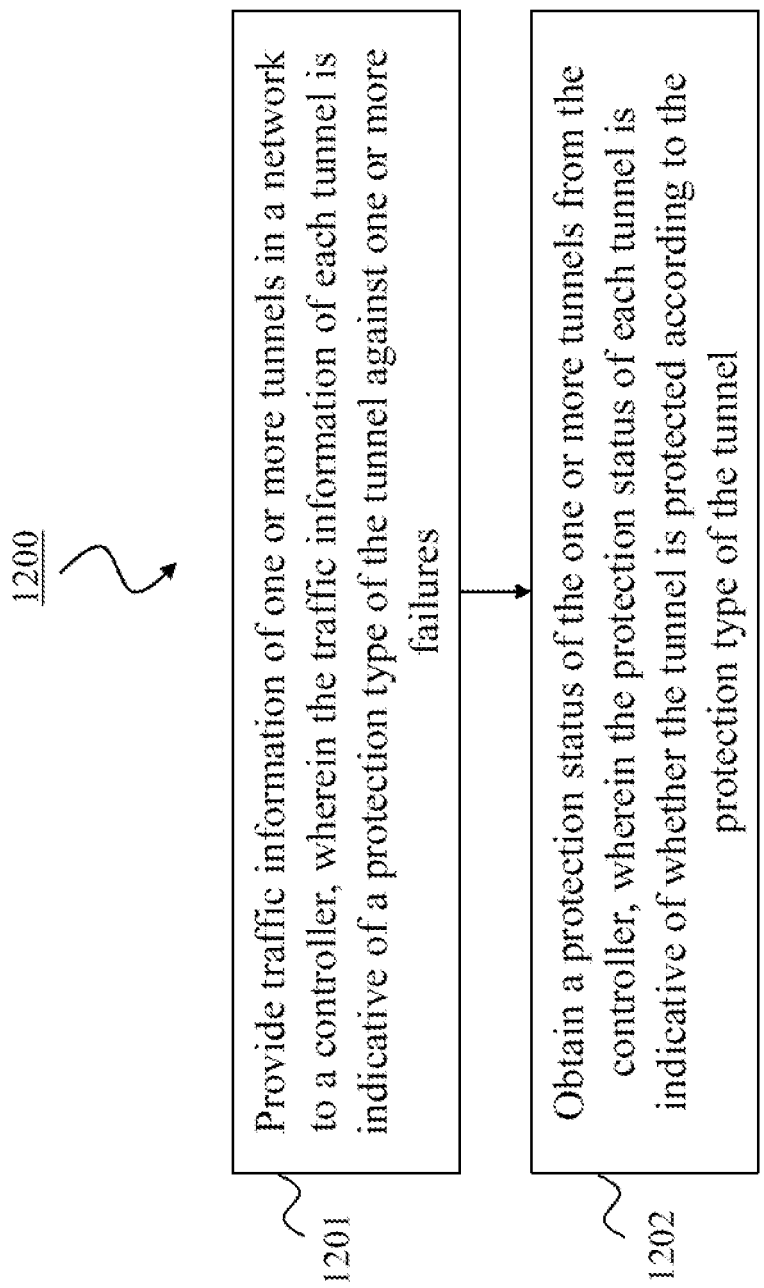
FIG. 12 shows yet another method according to an embodiment.

FIG. 12 shows a method 1200 according to an embodiment for supporting protected load balancing in a network. The network may include a controller 300 and a plurality of network nodes 310. In an embodiment, the method 1200 may be performed by a user device 320 shown in FIG. 9. The method 1200 includes a step 1201 of providing traffic information 301 of one or more tunnels in the network to the controller 300, where the traffic information 301 of each tunnel is indicative of a protection type of said tunnel against one or more failures. The method 1200 further includes a step 1202 of obtaining protection status 304 of the one or more tunnels from the controller 300, where the protection status 304 of each tunnel is indicative of whether the tunnel is protected according to the protection type of the tunnel. Possibly, the controller 300 is the controller shown in FIG. 3 or FIG. 7, and the network node 310 is the network node shown in FIG. 6 or FIG. 7.

An apparatus and a method for protected load balancing in IP networks are proposed. The embodiments may provide an apparatus for global configuration of load balancers to protect against SRLG failures. It may allow an adjustment of split ratios for a set of tunnels or flow aggregates based on given bandwidth requirements to protect against every possible SRLG failure. The embodiments may monitor the protection level at ingress devices based on a critical bandwidth level. Various schemes are supported in order to minimize traffic loss or guarantee zero traffic loss.

The embodiments may propose a method to achieve zero traffic loss or minimum traffic loss and may allow an adjustment of split ratios to fully protect tunnels or flow aggregates in case of every possible SLRG failure. It guarantees that the load can be safely transferred to remaining active paths. Notably, embodiments can be implemented with and without bandwidth reservations.

In the case of SR, no bandwidth reservations can be made. Traffic losses cannot be guaranteed but they are expected to be minimum. Split ratios are periodically adjusted to follow traffic variations such as when the network applies a multiprotocol label switching technique.

In the case of MPLS, a bandwidth reservation can be enforced on each sub-path.

Various embodiments have been described in conjunction with implementations. However, other variations can be understood and effected by those persons skilled in the art and practicing the embodiments. In the embodiments, the indefinite article "a" or "an" does not exclude a plurality. A single element or other unit may fulfill the functions of several entities or items recited in the embodiments. The mere fact that certain measures are recited in the mutual different embodiments does not indicate that a combination of these measures cannot be used in an advantageous implementation.

Furthermore, any method according to embodiments may be implemented in a computer program, having code, which when run by a processor or the like causes the processor or the like to execute the steps of the method. The computer program is included in a non-transitory computer readable medium of a computer program product. The non-transitory computer readable medium may include essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, the embodiments of the controller 300, the network node 310, or the user device 320, may include the necessary communication capabilities in the form of e.g., functions, units, elements, etc., for performing the solution. Examples of other such units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, trellis-coded modulation (TCM) encoder, TCM decoder, power supply units, power feeders, communication interfaces, communication protocols, etc. which are suitably arranged together for performing the solution.

The processor(s) of the controller 300, the network node 310, or the user device 320 may include, e.g., one or more instances of a Central Processing Unit (CPU), a processing unit, a processing circuit, a processor, an application specific integrated circuit (ASIC), a microprocessor, or other processing logic that may interpret and execute instructions. The expression "processor" may thus represent a processing circuitry including a plurality of processing circuits, such as, e.g., any, some or all of the ones mentioned above. The processing circuitry may further perform data processing functions for inputting, outputting, and processing of data including data buffering and device control functions, such as call processing control, user interface control, or the like.

The invention claimed is:

1. A method for protected load balancing in a network, wherein the network comprises a controller and a plurality of network nodes and the method comprises the following steps executed by the controller:
    obtaining traffic information of one or more tunnels in the network, wherein the traffic information of each tunnel is indicative of a protection type of the tunnel against one or more failures; and
    providing configuration information to each network node that is a head-end node of a determined tunnel with a certain protection type, according to the obtained traffic information of the determined tunnel, wherein the configuration information comprises a bandwidth threshold and a load balancing configuration for the determined tunnel, wherein the bandwidth threshold is configured to indicate to the network node to send a notification to the controller when traffic through the determined tunnel is above the bandwidth threshold, and the load balancing configuration is configured to indicate to the network node how to split the traffic through the determined tunnel among a plurality of paths of the determined tunnel in case of a failure.

2. The method according to claim 1, wherein the traffic information of the one or more tunnels further comprises a quality of service requirement, and/or a traffic matrix comprising bandwidth estimations of the one or more tunnels.

3. The method according to claim 1, wherein the traffic information of the one or more tunnels is further configured to indicate a set of shared risk link groups (SRLGs) and each SRLG including a plurality of links of the one or more tunnels.

4. The method according to claim 3, further comprising:
    obtaining network information, wherein the network information comprises a topology of the network, and/or a characteristic of one or more links of the one or more tunnels; and
    determining the configuration information according to the obtained traffic information and the obtained network information.

5. The method according to claim 3, wherein the load balancing configuration for the determined tunnel is further configured to indicate the plurality of paths of the determined tunnel and a split ratio for each of the plurality of paths, and
    wherein the load balancing configuration for the determined tunnel is further configured to indicate to the network node how to split the traffic through the determined tunnel among the plurality of paths, when the failure is a failure of one SLRG of the set of SLRGs intersecting the one or more paths of the determined tunnel.

6. The method according to claim 5, further comprising:
    calculating the split ratio for each path, using the obtained traffic information, such that a load of a path that is affected by the failure can be transferred to one or more other paths that are not affected.

7. The method according to claim 5, wherein the configuration information further comprises bandwidth reservation information for one or more paths of the determined tunnel.

8. The method according to claim 7, wherein the bandwidth reservation information includes information on a bandwidth that is shared by the one or more paths, and/or information about a bandwidth that is for one path and not shared by other paths.

9. The method according to claim 1, further comprising:
    receiving one or more notifications from one or more of the network nodes, wherein each notification is configured to indicate that traffic through the one or more tunnels is above the bandwidth threshold or indicate a failure in the respective network node; and
    adjusting the configuration information according to the received one or more notifications.

10. The method according to claim 9, wherein each notification comprises one or more of:
    the failure; abnormal traffic information; tunnel bandwidth information; a current load balancing configuration; and a local bandwidth threshold of the respective network node.

11. The method according to claim 9, further comprising:
    determining a protection status for the one or more tunnels according to the received one or more notifications, wherein the protection status of each tunnel is indicative of whether the tunnel is protected according to the protection type of the tunnel; and
    providing the protection status of the one or more tunnels.

12. A method for protected load balancing in a network, wherein the network comprises a controller and a plurality of network nodes, the method comprises the following steps executed by a network node, and the network node is a head-end node of a tunnel in the network:
    receiving configuration information from the controller, wherein the configuration information comprises a bandwidth threshold and a load balancing configuration for the tunnel, wherein the bandwidth threshold is configured to indicate to the network node to send a notification to the controller when traffic through the tunnel is above the bandwidth threshold, and the load balancing configuration is configured to indicate to the network node how to split the traffic through the tunnel among a plurality of paths of the tunnel in case of a failure; and sending the notification to the controller, based on determining that the traffic of the tunnel is above the bandwidth threshold.

13. The method according to claim 12, further comprising:

sending the notification to the controller, based on detecting a failure in the network node.

14. A controller for protected load balancing in a network, wherein the network comprises the controller and a plurality of network nodes, wherein the controller comprises:

at least one processor; and at least one memory coupled to the at least one processor and configured to store instructions that, when executed by the at least one processor, cause the controller to:

obtain traffic information of one or more tunnels in the network, wherein the traffic information of each tunnel is indicative of a protection type of the tunnel against one or more failures; and provide configuration information to each network node that is a head-end node of a determined tunnel with a certain protection type, according to the obtained traffic information of the determined tunnel, wherein the configuration information comprises a bandwidth threshold and a load balancing configuration for the determined tunnel, wherein the bandwidth threshold is configured to indicate to the network node to send a notification to the controller when traffic through the determined tunnel is above the bandwidth threshold, and the load balancing configuration is configured to indicate to the network node how to split the traffic through the determined tunnel among a plurality of paths of the determined tunnel in case of a failure.

15. The controller according to claim 14, wherein the traffic information of the one or more tunnels further comprises a quality of service requirement, and/or a traffic matrix comprising bandwidth estimations of the one or more tunnels.

16. The controller according to claim 14, wherein the traffic information of the one or more tunnels is further configured to indicate a set of shared risk link groups (SRLGs) and each SRLG including a plurality of links of the one or more tunnels.

17. The controller according to claim 16, wherein the load balancing configuration for the determined tunnel is further configured to indicate the plurality of paths of the determined tunnel and a split ratio for each of the plurality of paths, and wherein the load balancing configuration for the determined tunnel is further configured to indicate to the network node how to split the traffic through the determined tunnel among the plurality of paths, when the failure is a failure of one SLRG of the set of SLRGs intersecting the one or more paths of the determined tunnel.

18. The controller according to claim 17, wherein when executed by the at least one processor, the instructions further cause the controller to:

calculate the split ratio for each path, using the obtained traffic information, such that a load of a path that is affected by the failure can be transferred to one or more other paths that are not affected.

19. The controller according to claim 14, wherein when executed by the at least one processor, the instructions further cause the controller to:

receive one or more notifications from one or more of the network nodes, wherein each notification is configured to indicate that traffic through the one or more tunnels is above the bandwidth threshold or indicate a failure in the respective network node; and adjust the configuration information according to the received one or more notifications.

20. The controller according to claim 19, wherein when executed by the at least one processor, the instructions further cause the controller to:

determine a protection status for the one or more tunnels according to the received one or more notifications, wherein the protection status of each tunnel is indicative of whether the tunnel is protected according to the protection type of the tunnel; and provide the protection status of the one or more tunnels.

* * * * *